May 1, 1956          D. J. WALKER          2,743,846
SUGAR AND CREAM SERVER AND DISPENSER
Filed Feb. 24, 1955
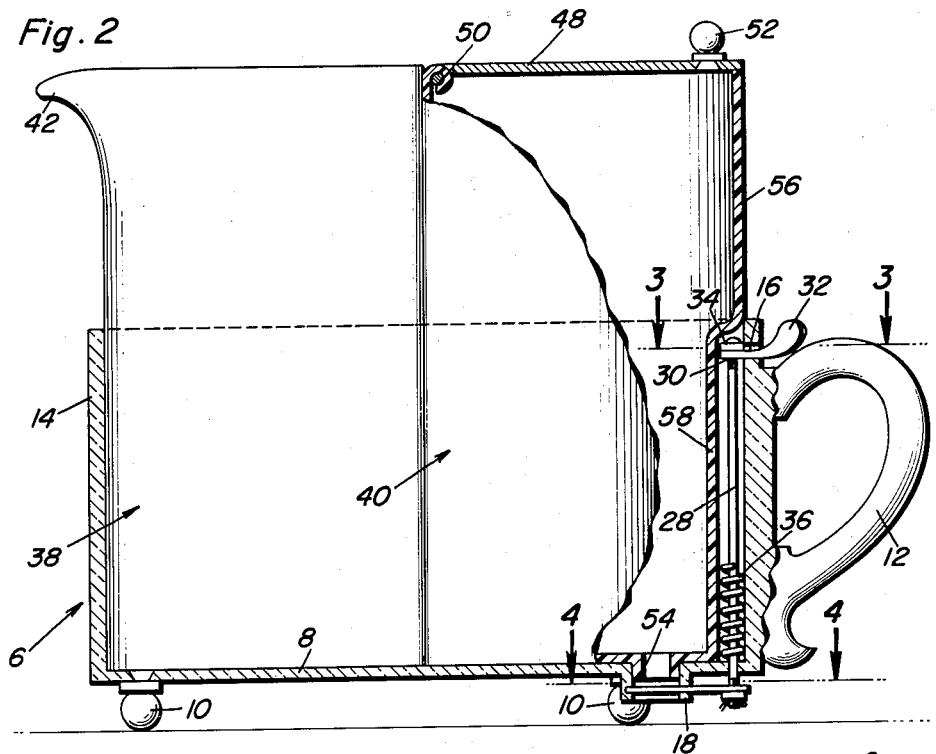
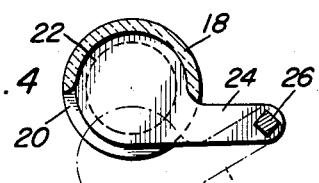
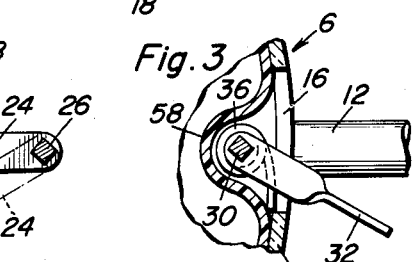
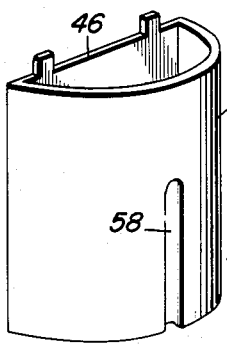
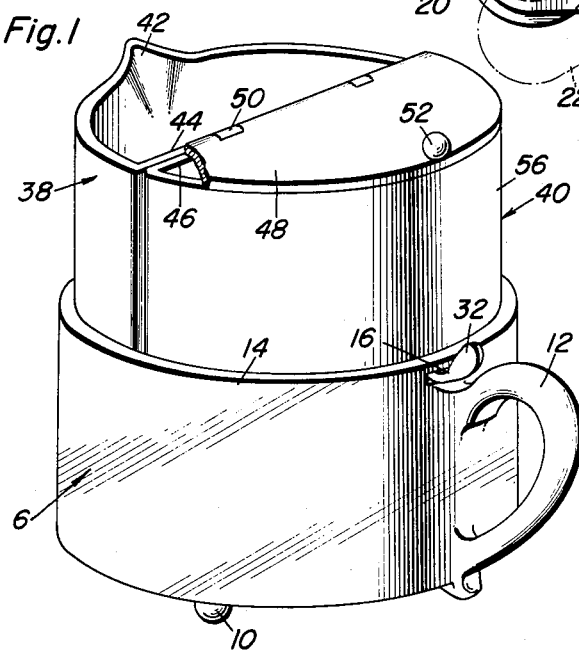
Duane J. Walker
INVENTOR.

United States Patent Office 2,743,846
Patented May 1, 1956

2,743,846

SUGAR AND CREAM SERVER AND DISPENSER

Duane J. Walker, Steubenville, Ohio, assignor of forty per cent to William T. Reed, Waverly, Ohio Application February 24, 1955, Serial No. 490,197

4 Claims. (Cl. 222—129)

The present invention relates to a novelly constructed kitchen and table accessory and pertains, more particularly stated, to a triple-part combination utensil.

In carrying out the inventive principles of the concept a simple, practical and economical multipurpose utensil is provided and has to do with two complemental components, one serving as a sugar bowl and the other as a pitcher or creamer, said components being removably fitted into a receiver functioning as a holder for said components, the several parts constituting a unique combination utensil which may be handily employed in serving and dispensing sugar and cream for persons at a table in the home, restaurant or the like.

In carrying out a preferred embodiment of the invention, the third mentioned part is a cup-like relatively shallow receiver and holder. This is provided with a handle and the sugar bowl and creamer are telescopically nested back-to-back in the receptacle portion of the receiver so that the latter may be picked up and passed from one person to another for dispensing the sugar, cream, or both.

Another object of the invention is to provide a three-part assembly which, when the parts are together, constitutes a unit or entity with each part contributing its function or proportionate share to the common result of serving and dispensing, to in this manner provide a novel contribution to the art in which manufacturers and retailers and various users will find their respective requirements and needs not only satisfactorily taken into account but structurally, functionally and otherwise effectually met.

Then, too, novelty is predicated upon the cooperation and interaction of the components or several parts with a single handle and wherein the receiver has to do with a novel purpose to be fulfilled, the handy dispensing of sugar and, to this end, having a sugar discharge opening in its bottom which is valved and opened and closed so that sugar from the sugar container may be dispensed therethrough either into a teaspoon or into a cup of coffee by holding the valved discharge opening over the cup.

Other objects, features and advantages will become more readily apparent from the following description and the accompanying sheet of illustrative drawings.

In the drawings, wherein like numerals are employed to designate like parts throughout the views:

Figure 1 is a perspective view, with a portion appearing in section, of a multipurpose serving and dispensing utensil constructed in accordance with the principles of the present invention;

Figure 2 is an enlarged view with portions broken away and appearing in section and partly in elevation and showing the details of construction with greater particularity;

Figures 3 and 4 are sections on the horizontal lines 3—3 and 4—4, respectively, of Figure 2 looking in the direction of the arrows; and Figure 5 is a perspective view, on a small scale, of the sugar bowl.

Referring now to the drawings with numerals and accompanying lead lines, the first container, which constitutes the holder, carrier and server, is denoted by the numeral 6 and it is preferably a relatively shallow cylindrical cup-like receptacle or receiver. It is of any appropriate lightweight material. It could, of course, be of an appropriate grade of commercial plastics. In any event, it is provided on its bottom 8 with suitable ball-like or equivalent supporting feet 10 and may be set on a table or shelf in an obvious ready-to-use manner. On one side it is provided with an integral suitably designed and handily located handle or handgrip 12. Above the top portion of the handgrip the wall 14 is provided with a horizontal arcuate slot 16. Adjacent to this slotted wall and in the bottom there is a discharge opening and a depending dispensing or discharge neck 18. This is slotted as at 20 in Figure 4 to accommodate an openable and closable disc-like or equivalent valve 22. The valve has a radial outstanding operating arm 24 which is keyed as at 26 to the lower end of a vertical oscillatory or rocker shaft 28. This shaft is mounted within the confines of the wall of the receiver and it has a flat sided upper end 30 carrying a suitably keyed operating lever which extends through the slot 16 and terminates in a fingerpiece 32 which may be operated by the thumb of the same hand which grips or holds the handle 12. Also near this point there is on the interior of the wall a lug 34 providing a bearing in which the upper end of the shaft is journaled for oscillation. Thus, it is possible to pick up and serve this cup-like receiver in an obvious manner and to catch hold of the handle and reach up with the thumb and open and close the valve by way of the rocker shaft or rod. There is a coil return spring 36 provided and this is suitably attached at one end to the rod and anchored to the bottom of the receiver in the manner illustrated at the right in Figure 3.

The two insertible and removable companion containers are the second and third containers and one is denoted by the numeral 38 and the other one by the numeral 40. These may be of commercial plastics and the container 38 is a cream pitcher and is semicircular in cross-section and has a suitable pouring spout 42 located opposite to the flat so-called back wall 44 in the manner brought out in Figure 1. This back wall is in contact with a similar flat back wall 46 of the other container 40 which in this instance is a sugar bowl or container. The two containers being combinedly cylindrical fit back-to-back and telescopically in the receptacle portion of the receiver in the manner shown. There is a suitable lid 48 hingedly mounted in any suitable manner at 50 to open and close, said lid being provided on its free edge portion with a grip or knob 52 for handy operation. There is a discharge neck 54 provided at the bottom of the sugar container. This telescopes into the discharge neck 18 and thus makes it possible to empty the sugar from the container through the two discharge necks into a teaspoon (not shown) or cup of coffee (not shown) by holding the parts in proper registering alignment with each other. The semicircular wall portion 56 (see Figure 5) of the sugar container is provided with a vertical recess, groove or flute 58 which provides a clearance pocket for the aforementioned valve operating shaft, spring trip lever, etc.

It is repeated therefore that the subject matter of the invention has to do with a triple-featured container assembly wherein the containers, when fitted together in the manner illustrated in the drawings, provide a structural entity in which the principal container 6 serves as the holder and server and, in part, as the dispenser. A single handle thereon permits this result to be satisfactorily accomplished. Also, the trip lever being close to the handle or handgrip makes it possible for the single hand to lift up the assembly, pass it from one person to the other and also use it for tilting the cream pitcher for pouring and holding the sugar container at the desired level in position for dispensing. All of the features, therefore, contribute to the unique over-all result of a holder, server and dispenser which, it is believed, fulfills the intended purposes of the invention in a practical and satisfactory manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A multipurpose serving and dispensing utensil for kitchen and table use comprising, in combination, a cup-like receiver circular in cross-section and having a bottom and an integral upstanding marginal wall, said wall provided on its outer peripheral surface with an outstanding handgrip, a first insertable and removable semicylindrical receptacle having its lower portion fitted telescopically into one-half portion of said receiver, a second semicylindrical receptacle also telescopically fitted into the remaining half portion of said receiver, said receptacles having flat back portions in back-to-back contact and convex wall portions conformably fitting and contacting co-operating conformingly shaped arcuate portions of said marginal wall, said first receptacle having a pouring spout at its upper end and constituting a cream pitcher, said second receptacle being adapted to contain and also dispense sugar and having a restricted discharge neck at its bottom, the bottom of said receiver having a discharge opening and a depending discharge neck aligned with said opening, said first named neck telescoping into said second named neck, and common valve means for said necks operably mounted in the second named neck.

2. The structure defined in claim 1, and a manually actuatable shaft mounted for oscillation in said receiver and having a lower end operatively connected with said valve, the upper end of said shaft having a fingerpiece, the wall of said receiver having a slot, and said fingerpiece being operable in said slot and located in close proximity to said handgrip.

3. In a structure of the class described, a cylindrical cup-like receiver having a bottom and an upstanding marginal wall provided with an outstanding radially disposed handgrip, and provided above said handgrip with a slot, the bottom of said receiver having a discharge opening and a depending discharge neck, said discharge neck having a slot, a valve operable in said slot and co-operable with said discharge neck, and an operating connection for said valve and mounted on said marginal wall embodying a spring-returned shaft mounted for manual oscillation in said receiver within the limits of the wall and keyed at its lower end to said valve and having its upper end journaled for rotation in a bearing, and a trip lever keyed on the upper end of said shaft and extending outwardly through said slot and having a fingerpiece projecting outwardly and beyond said wall and positioned in convenient cooperative relationship in respect to the adjacent upper portion of said handgrip, and an insertable and removable partial liner for said receiver fitting telescopically into said receiver and having a bottom resting atop the interior surface of the bottom of said receiver, said liner bottom having a discharge neck depending therefrom and extending downwardly into the discharge opening and also into said discharge neck and terminating in a plane above said valve, whereby both necks are controlled by said valve.

4. The structure defined in claim 3 and wherein said liner comprises a vertically elongated receptacle adapted to contain material which will gravitate through the discharge neck in the bottom thereof, said receptacle portion being substantially semicylindrical in cross-section and presenting a semicircular wall conforming with the proximate complemental half portion of the wall of said receiver, and the combination with said receiver and partial liner of a cream pitcher also semicylindrical in cross-section and having a semicircular wall contacting the interior surface of the remainder of the wall of said receiver, and having a vertically extending flat back, the respective flat backs of said partial liner and cream pitcher being in back-to-back contact and said receiver constituting a holder and server for said partial liner and cream pitcher.

References Cited in the file of this patent

UNITED STATES PATENTS

| | | |
|---|---|---|
| 65,430 | Putnam | June 4, 1867 |
| 166,791 | Long | Aug. 17, 1875 |
| 304,214 | McCarthy | Aug. 26, 1884 |
| 470,018 | Strong | Mar. 1, 1892 |
| 488,721 | Stempel | Dec. 27, 1892 |
| 533,655 | Lomax | Feb. 5, 1895 |
| 847,014 | Lee | Mar. 12, 1907 |
| 1,035,180 | Goss | Aug. 13, 1912 |
| 1,327,156 | Hanes | Jan. 6, 1920 |
| 1,677,845 | Pinney | July 17, 1928 |
| 1,893,628 | Marsden | Jan. 10, 1933 |
| 1,894,157 | Campbell | Jan. 10, 1933 |
| 1,996,856 | Crane | Apr. 9, 1935 |
| 2,190,441 | Cecil | Feb. 13, 1940 |
| 2,271,822 | Hills | Feb. 3, 1942 |